United States Patent [19]

Jones

[11] 3,897,487

[45] July 29, 1975

[54] PREPARATION OF 5-FLUORO-2-METHYL-1-(P-METHYLSULFINYLBENZYLIDENE) INDENYL-3-ACETIC ACID

[75] Inventor: Howard Jones, Holmdel, N.J.

[73] Assignee: Merck & Co., Inc., Rahway, N.J.

[22] Filed: Oct. 3, 1973

[21] Appl. No.: 402,944

[52] U.S. Cl............ 260/515 A; 260/340.9; 260/470; 260/590
[51] Int. Cl........................................... C07c 147/00
[58] Field of Search.......................... 260/515 A, 470

[56] References Cited
UNITED STATES PATENTS
3,312,730   4/1967   Winter................................ 260/473

Primary Examiner—James A. Patten
Attorney, Agent, or Firm—Mario A. Monaco; Harry E. Westlake, Jr.

[57] ABSTRACT

Process for preparing 5-fluoro-2-methyl-1-(p-methylsulfinylbenzylidene)-indenyl-3-acetic acid, by reacting 5-fluoro-2-methylindene-1,3-dione-3,3'-o-ethylene ketal with a p-methylsulfinylbenzyl compound, hydrolysis, and subsequent reaction with a malonic acid ester.

4 Claims, No Drawings

3,897,487

PREPARATION OF 5-FLUORO-2-METHYL-1-(P-METHYLSULFINYL-BENZYLIDENE) INDENYL-3-ACETIC ACID

This invention is directed to the preparation of 5-fluoro-2-methyl-1-(p-methylsulfinylbenzylidene)-3-indenyl acetic acid.

BACKGROUND OF THE INVENTION

The above mentioned 3-indenyl acetic acid is a known compound having anti-inflammatory activity as described in U.S. Pat. No. 3,654,349. In the past, this compound has been prepared by condensing an appropriate substituted benzaldehyde with an acetic acid ester in a Claisen Reaction or with an α-halogenated propionic acid ester in a Reformatsky Reaction. The resulting unsaturated ester was reduced and hydrolyzed to give a β-aryl propionic acid which was ring closed to form the indanone. The aliphatic acid side chain was then introduced by a Reformatsky or Wittig Reaction and the 1-substituent was introduced into the resultant indenyl acetic acid or ester by reacting said acetic acid derivative with an aromatic aldehyde or ketone of the desired structural formula and dehydrating to form the desired indenyl acetic acid.

It is an object of this invention to provide a new process for preparing 5-fluoro-2-methyl-1-(p-methylsulfinylbenzylidene)-3-indenyl acetic acid.

DETAILS OF THE INVENTION

In accordance with one aspect of this invention, it has been found that the subject compound can be readily prepared by a combination of reaction steps; namely, by the nucleophillic addition of a p-methylsulfinylbenzyl compound to the 1-carbonyl of 5-fluoro-2-methylindene-1,3-dione-3,3'-o-ethylene ketal to thus form 5-fluoro-2-methyl-1-(p-methylsulfinylbenzylidene)-indene-3,3'-o-ethylene ketal which in turn is deblocked to 5-fluoro-2-methyl-1-(p-methylsulfinylbenzylidene)-indane-3-one. The thus prepared 3-one compound is reacted under Stobbe conditions to form the corresponding arylidene malonic acid monoester which is subsequently decarboxylated, and hydrolyzed to form the desired product. In another aspect of this invention, one starts with the 1-benzylidene substituted 3,3'-o-ethylene ketal as the starting material and the reaction carried out as indicated above.

More specifically, the nucleophillic addition of the p-methylsulfinylbenzyl compound to the 5-fluoro-2-methylindene-1,3-dione-3,3'-o-ethylene ketal can be readily carried out by either the well known Grignard Reaction or the well known Wittig Reaction to form 5-fluoro-2-methyl-1-(p-methylsulfinylbenzylidene)-indane-3,3'-o-ethylene ketal. In the case of the Grignard Reaction, 5-fluoro-2-methylindene-1,3-dione-3,3'-o-ethylene ketal is, for example, reacted with a Grignard reagent, for example, prepared by reacting a p-methyl-sulfinylbenzyl halide (i.e., chloride or bromide) and magnesium at a temperature of from 0° to 100°C for a period of time of from 1 to 6 hrs, but preferably at a temperature of from 20° to 60°C for 1 to 1.5 hrs. This reaction can be carried out in the presence of an inert solvent such as ether, tetrahydrofuran, dioxane, hexane. The Grignard product may, if desired, then be isolated by techniques well known to the art, subsequently reacted with the ketal in the presence of an inert solvent such as benzene, toluene, xylene or cyclohexane at a temperature of 0° to 100°C for a period of 1 to 5 hrs, and then with a dehydrating agent such as phosphorous pentachloride, phosphorous pentoxide, polyphosphoric acid, p-toluenesulfonic acid or dicyclohexylcarbodiimide at 20° - 108°C. Preferably, however, the reaction between the Grignard reagent and ketal compound is carried out in the presence of an inert solvent such as ether or THF (for 1-12 hours at 0° - 20°C) and in the presence of phosphorous pentoxide or pTsOH at a temperature of 60° to 80°C for a period of 15 minutes to 2 hours in benzene.

Alternatively, the nucleophillic addition may be carried out by the well known Wittig Reaction. For example, the reaction may be carried out by the reaction of the appropriate ar-alkylidenephosphorane with 5-fluoro-2-methyl-1,3-dione-3,3'-o-ethylene ketal. More specifically, the reaction may be carried out by reacting the 5-fluoro-2-methyl-indene-1,3-dione-3,3'-o-ethylene ketal with p-methylsulfinylbenzylidenetriphenylphosphorane in the presence of an inert solvent such as benzene, toluene, hexane, ether, THF, or dimethylsulfoxide for a period of time of from 1 to 8 hours. Concentration of reactants is not critical and accordingly one may use from 2 to 10 moles of phosphorane to one mole of ketone. The thus prepared 5-fluoro-2-methyl-1-(p-methylsulfinylbenzylidene)-indene-3,3'-o-ethylene ketal is hydrolyzed to the corresponding 5-fluoro-2-methyl-1-(p-methylsulfinylbenzylidene)-indane-3-one. The reaction may be suitably carried out under mild acid conditions, and in fact depending upon the reaction conditions of the nucleophillic reaction of the previous step may be accomplished in situ during the reaction or work up of the previous step. Acids such as aqueous pTsOH, aqueous HCl, aqueous $H_2SO_4$ may be employed and preferably aqueous HCl. The reaction is carried out at a temperature of from 0° to 100°C and preferably from 15° to 25°C until hydrolysis is complete. Since the hydrolysis can be carried out with a catalytic amount of acid, excess acid is not necessary to the reaction.

The 5-fluoro-2-methyl-1-(p-methylsulfinylbenzylidene)-indane-3-one thus prepared is then condensed under Stobbe' conditions to form 5-fluoro-2-methyl-1-(p-methylsulfinylbenzylidene)-3-indenyl acetic acid.

More specifically, a malonic acid ester is first reacted in the presence of a strong base with 5-fluoro-2-methyl-1-(p-methylsulfinylbenzylidene)-indane-3-one to form the corresponding arylidene malonic acid monoester. The ester moiety of the malonic acid is not critical and may suitably be any alkyl, aryl or ar-alkyl ester such as $C_{1-5}$ alkyl(methyl, ethyl, propyl or t-butyl), phenyl or substituted phenyl, phenyl ($C_{1-5}$ alkyl) such as benzyl, phenethyl, and the like or substituted phenyl ($C_{1-5}$ alkyl). Preferably, the ester is the $C_{1-5}$ alkyl ester and especially methyl. The reaction with the malonate ester may be carried out with or without a solvent. If a solvent is desired, any inert solvent such as benzene, ether, THF (for sodium metal) liquid ammonia (for sodamide), t-Butanol (for potassium t-butoxide) may be employed. The base employed may be any strong base such as alkali metal or alkali earth alkoxides, alkali hydroxides, sodamide, sodium hydroxide, sodium metal or potassium t-butoxide, sodium ethoxide, NaoMe and preferably an alkali $C_{1-5}$ alkoxide such as potassium ter-butoxide or sodium methoxide. The reaction may be carried out at a temperature of from −80° to 100°C and especially 60° to 80°C. The concentration of the reactants and strong base is not critical and, therefore, any suitable concentration may be used such as from 1.0 to 2.0 mole of ester to dione, especially 1.0 to 1.5 mole and 1.0 to 5.0 mole of base to ester, especially 1.0 to 1.1 mole. The arylidene compound thus formed is decarboxylated by means well known in the art such as by heating said compound in the presence of an organic acid or mineral acid such as aqueous p-toluene sulfonic acid, concentrated HCl, concentrated HBr or phosphoric acid. Any inert solvent may be used in this reaction such as benzene, toluene or xylene. However, it is preferred to carry out the reaction in the presence of an aqueous mineral acid such as hydrochloric acid using it both as the solvent and acid reactant as well. The concentration of the acid employed is not critical and accordingly it is preferred to add sufficient acid to acidify the reaction mixture. The reaction is suitably carried out at or near the reflux temperature of the system until substantial decarboxylation has taken place (i.e., evolution of $CO_2$ has stopped), to form 5-fluoro-2-methyl-1-(p-methylsulfinylbenzylidene)-indenyl-3-acetic acid.

The starting material for this invention; namely, 5-fluoro-2-methylindane-1,3-dione-3,3'-o-ethylene ketal is prepared by reacting 5-fluoro-2-methyl-indanone-1,3-dione with ethylene glycol. The 5-fluoro-2-methyl indanone-1,3-dione can be prepared by hydrogenating nitrophthalic acid to 4-aminophthalic acid in the presence of platinum or carbon, zinc and acetic acid or iron and hydrochloric acid in the presence of an inert solvent such as ethyl acetate, methanol or ethanol at a temperature of from 20° to 60°C, preferably at or about room temperature under pressures of from 1 to 30 atmos but especially 1 to 2 atmos until the required amount of hydrogen is taken up. The 4-aminophthalic acid is then converted to the corresponding 4-fluorophathalic acid by well known means for converting an amino group to a fluoro group. For example, the reaction may be carried out by dissolving the 4-aminophathalic acid in fluoroboric acid at temperatures of from 0° to 10°C and subsequently adding sodium nitrite to diazotize the amine, raising the temperature to decompose the diazonium salt and cause the formation of 4-fluorophathalic acid. This latter compound is then converted to its corresponding diester such as the $C_{1-5}$ dialkyl ester (i.e., diethyl ester) by means well known to the art. For example, the 4-fluorophathalic acid may be reacted in the presence of ethanol in a small quantity of concentrated sulfuric acid and refluxed for a sufficient period of time to form the appropriate diester. The 4-fluorophathalic diester thus formed is then readily converted to its corresponding 5-fluoro-2-methyl-indanone-1,3-dione by admixing the diester with methanol and sodium and then slowly added to a $C_{1-5}$ alkyl ester of propionic acid such as ethylpropionate and the solution refluxed for a period of time such as from 2 to 6 hours to form the desired dione.

The following examples are given by way of illustration.

EXAMPLE 1

A. 4-Aminophathalic acid

4-Nitrophathalic acid (0.2 mole) [Gaz. Anin. et al. 329–341 87 (1957)] is hydrogenated over 10% Pd/C in ethyl acetate (1 l.) at room temperature and 42 p.s.i. until the theoretical uptake of 2 moles of hydrogen have been taken up. The catalyst is filtered off and the solvent evaporated down to dryness to give 4-aminophathalic acid.

B. 4-Fluorophathalic acid

4-Aminophathalic acid (0.2 mole) is dissolved in 200 ml. of 48% fluoroboric acid and cooled to 0°–5°C in an ice-ethanol bath. Keeping the temperature below 10°C the amine is diazotized by adding a solution 14.7 g. (0.21 mole) of sodium nitrite in small portions with stirring. The solution is allowed to stand at 10°C for 1 hour and is then warmed to room temperature to decompose the diazonium salt. After the evolution of nitrogen has ceased the solution is extracted into ethyl acetate (3 × 200 ml.) and dried ($MgSO_4$). The solution is filtered, evaporated and the acid recrystallized from alcohol.

C. Diethyl 4-fluorophathalate

The acid above (0.2 mole) in ethanol (200 ml.) and 0.5 ml. concentrated sulfuric acid is refluxed for 3 hours and evaporated to 1/10 volume. The organics are taken up in ether (200 ml.) and the ether solution is washed well with saturated sodium bicarbonate solution (3 × 100 ml.), water (100 ml.), separated and dried ($MgSO_4$). The organic solution after filtration is evaporated to dryness to give the subject compound as a liquid.

D. 5-Fluoro-2-methylindane-1,3-dione

To a mixture of the diethyl ester above (0.2 mole) and metallic sodium (0.4 mole) is added slowly, with cooling and stirring, ethyl propionate (0.4 mole). The solution is then refluxed for 4 hours and washed with 500 ml. of ether. The precipitated solid is filtered, dissolved in water (300 ml.) washed with ether (100 ml.) and the aqueous layer acidified with sulfuric acid until the evolution of carbon dioxide ceases. The mixture is extracted into $CH_2CL_2$ (3 × 200 ml.), the $CH_2CL_2$ solution washed with water (2 × 100 ml.), dried ($MgSO_4$), filtered and evaporated to dryness to give an oil which crystallizes on cooling.

EXAMPLE 2

A. 5-Fluoro-2-methylindane-1,3-dione-3,3'-o-ethylene ketal

5-Fluoro-2-methylindane-1,3-dione (0.5 mole) and ethylene glycol (0.52 mole) in benzene (600 ml.) are refluxed together with p-toluene sulfonic acid (2.1 gm.) for 18 hours. The benzene is then washed with 5% sodium hydroxide solution (4 × 200 ml.), water (2 × 100 ml.) and dried. The solution is filtered and evaporated to dryness.

The crude product is chromatographed on a column of silica (2 ft. × 2½ in.) using solutions n-hexane-ether as eluants. In this way, the subject compound above is obtained pure from the other products in the reaction mixture; namely, 5-fluoro-2-methylindane-1,3-dione-1,1'-3,3'-o-ethylene ketal and some starting material 5-fluoro-2-methylindane-1,3-dione.

B. p-Methylsulfinylbenzylbromide

N-Bromosuccinimide (0.1 mole) is added to a solution of p-methylthiotoluene (0.1 mole) in carbon tetrachloride (200 ml.) and the solution is refluxed for 2 hours. The reaction mixture is filtered, evaporated to dryness and put on a column of $SiO_2$ (18 in. × 1 in.). Elution with mixtures of n-hexane-ether gives fractions which contain pure p-methylthiobenzyl bromide as an oil.

The above compound (0.1 mole) is oxidized at room temperature in acetone-water (10:1, 200 ml.) with sodium metaperiodate (0.4 mole). The reaction being followed by t.l.c. in n-hexane to prevent over oxidation.

The product is isolated by evaporating to one-third volume and washing this reaction product in ether (100 ml.) well with water. The ether layer is dried ($MgSO_4$), filtered and evaporated to give the solid p-methylsulfinylbenzylbromide.

Molecular bromine under light can be used in place of N-bromosuccinimide in the first part.

The oxidation can be done using aqueous hydrogen peroxide (cold), hypohalide solution, ruthenium tetroxide, peracetic and perbenzoic acids.

B. (1) 5-Fluoro-2-methyl-1-(p-methylsulfinylbenzylidene)-indane-3,3′-o-ethylene ketal 5-Fluoro-2-methylindane-1,3-dione-3,3′-o-ethylene ketal (0.1 mole) obtained from 2A is stirred at 10°C in benzene (300 ml.) under nitrogen while a Grignard reagent made from p-methylsulfinylbenzyl bromide (0.15 mole) and magnesium (0.2 g. atom) in THF (100 ml.) is added over 30 min. The solution is then stirred at room temperature for 18 hours, washed well with saturated ammonium chloride solution (200 ml.) and the benzene layer separated. The benzene solution is dried ($MgSO_4$), filtered and phosphorous pentoxide (5 gm.) added to the solution. The solution is stirred and refluxed for 2 hours and then filtered. The benzene solution is washed well with saturated sodium bicarbonate solution (2 × 50 ml.), water (1 × 50 ml.), dried ($MgSO_4$) and filtered. The benzene layer is evaporated to dryness to give 5-fluoro-2-methyl-1-(p-methylsulfinylbenzylidene)-indane-3,3′-o-ethylene ketal.

C. 5-Fluoro-2-methyl-1-(p-methylsulfinylbenzylidene)-indane-3-one

The compound obtained in Example 2B above (0.2 mole) is dissolved in aqueous alcoholic hydrochloric acid (1 : 1 2N. 200 ml.) and stirred at room temperature for 6 hours. The alcohol is evaporated off at 20°C and the crude product extracted into ether (200 ml.), dried ($MgSO_4$) and filtered. Evaporating the solvent gives the subject compound which can be used in the next series of reactions without further purification.

D. 5-Fluoro-2-methyl-1-(p-methylsulfinylbenzylidene)-3-indenyl acetic acid

A mixture of 5-fluoro-2-methyl-1-(p-methylsulfinylbenzylidene)-indane-3-one (0.3 mole), diethylmalonate (0.25 mole) and anhydrous potassium tert-butoxide (0.025 m) in t BuOH (400 ml.) are stirred together under nitrogen at room temperature for 2 hours and then at reflux for 6 hours. The reaction mixture is then acidified with 2.5 N hydrochloric acid and heated and stirred at reflux for a further 3 hours or until the evolution of carbon monoxide has stopped.

The organic material is extracted into ethyl acetate (3 × 200 ml.), washed with water, separated and dried ($MgSO_4$). The solution is filtered, evaporated to dryness to yield the desired product.

EXAMPLE 3

5-fluoro-2-methyl-1-(p-methylsulfinylbenzylidene)-indane-3,3′-o-ethylene ketal

The benzyl bromide (0.1 mole) from example 2B is mixed with triphenyl phosphine (0.1 mole) in tetrahydrofuran (20 ml.) in a sealed tube and left at R.T. for 2 days. p-Methylsulfinylbenzenetriphenylphosphine bromide is filtered off.

To the above phosphine bromide (0.05 ml.) in liquid ammonia (50 ml.) is slowly added with stirring at −80°C freshly made sodamide (0.05 ml.) and benzene (50 ml.) is added and the liquid ammonia is allowed to boil away. The sodium bromide is filtered off and the salt-free solution is added at room temperature to a stirred solution of the 1,3-dione-3,3′-o-ethylene ketal from example 2A (0.045 ml.) in dimethoxy-ethane (60 ml.) over 20 minutes. The ppt. triphenyl phosphorine oxide is filtered off and the evaporated filtrate chromatographed on a column of silica-gel (2 ft. × 1.5 in.) using solution of chloroform-ethanol to yield the desired product.

What is claimed is:

1. A process for preparing 5-fluoro-2-methyl-1-(p-methylsulfinylbenzylidene)-3-indenyl acetic acid which comprises the steps of:
   a. condensing 5-fluoro-2-methylindane-1,3-dione-3,3′-o-ethylene ketal with p-methylsulfinylbenzylmagnesium halide followed by dehydration or with p-methylsulfinylbenylidenetriphenylphosphorane to form 5-fluoro-2-methyl-1-(p-methylsulfinylbenzylidene)-indane-3,3′-o-ethylene ketal;
   b. hydrolyzing said indane under aqueous acidic conditions to form 5-fluoro-2-methyl-1-(p-methylsulfinylbenzylidene)-indane-3-one;
   c. condensing said indane-3-one compound with a malonic acid ester in the presence of a strong base to form the diester of 5-fluoro-2-methyl-1-(p-methylsulfinylbenzylidene)-3-indenyl malonic acid;
   d. hydrolyzing said diester under aqueous acidic conditions to form the the indane-3-malonic acid; and
   e. decarboxylating said indane-3-malonic acid by heating.

2. The process of claim 1 wherein a dialkylmalonate is used in Step (c).

3. A process for preparing 5-fluoro-2-methyl-1-(p-methylsulfinylbenzylidene)-3-indenyl acetic acid which comprises the steps of:
   a. hydrolyzing 5-fluoro-2-methyl-1-(p-methylsulfinylbenzylidene)-indane-3,3′-o-ethylene ketal under aqueous acidic conditions to form 5-fluoro-2-methyl-1-(p-methylsulfinylbenzylidene)-indane-3-one;
   b. condensing said indane-3-one compound with a malonic acid ester in the presence of a strong base to form the diester of 5-fluoro-2-methyl-1-(p-methylsulfinylbenzylidene)-3-indenyl malonic acid;
   c. hydrolyzing said diester under aqueous acidic conditions to form the corresponding diacid; and
   d. decarboxylating said diacid by heating to form the desired product.

4. The process of claim 3 wherein a dialkylmalonate is used in Step (b).

* * * * *